A. B. BODIE.
NUT LOCK.
APPLICATION FILED APR. 28, 1921.

1,404,186.

Patented Jan. 24, 1922.

Inventor
Albert B. Bodie

By Percy H. Moore
Attorney

UNITED STATES PATENT OFFICE.

ALBERT B. BODIE, OF COLUMBIA, SOUTH CAROLINA, ASSIGNOR OF TWENTY-ONE PER CENT TO HEBER S. SHEALEY, TWENTY-FOUR PER CENT TO ANDREW J. MOBLEY, SIXTEEN AND TWO-THIRDS PER CENT TO G. T. PUGH, TEN PER CENT TO WILLIAM N. DYESS, SIX AND ONE-SIXTH PER CENT TO ELLIS R. BRECK, AND SIX AND ONE-SIXTH PER CENT TO ALLEN L. ROGERS, ALL OF COLUMBIA, SOUTH CAROLINA.

NUT LOCK.

1,404,186.  Specification of Letters Patent.  Patented Jan. 24, 1922.

Application filed April 28, 1921. Serial No. 465,324.

*To all whom it may concern:*

Be it known that I, ALBERT B. BODIE, a citizen of the United States of America, residing at Columbia, in the county of Richland and State of South Carolina, have invented certain new and useful Improvements in Nut Locks, of which the following is a specification.

My invention relates to improvements in nut locks, employing juxtaposed similarly screw threaded nuts having opposing cam surfaces which cause the nuts to grip the threads of a bolt in binding relation when the nuts are turned in opposite directions. The invention also contemplates auxiliary means for automatically and positively locking the parts in said binding or clamping engagement.

Other and further objects will be in part obvious and in part pointed out hereinafter.

In the accompanying drawings forming a part of this specification:

Figure 1:
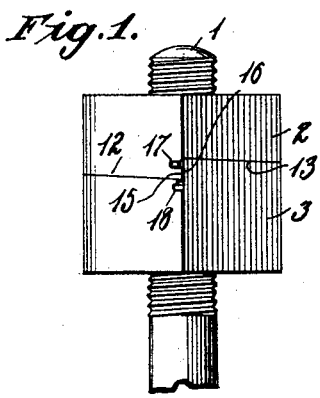
Figure 1 is a side view of the invention in unlocked position.
Figure 2:
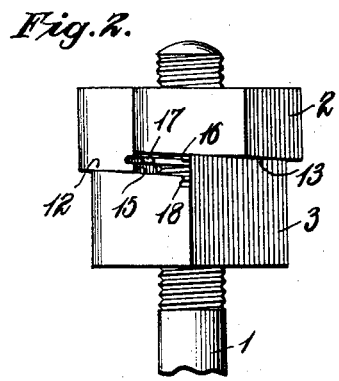
Figure 2 is a side view of the invention in locked or clamped position.
Figure 3:
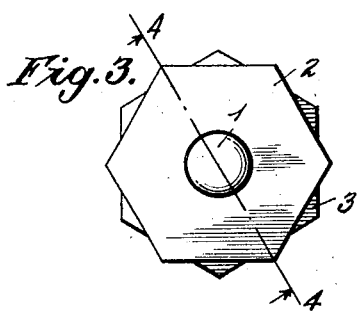
Figure 3 is a plan view of the invention in locked or clamped position.
Figure 4:
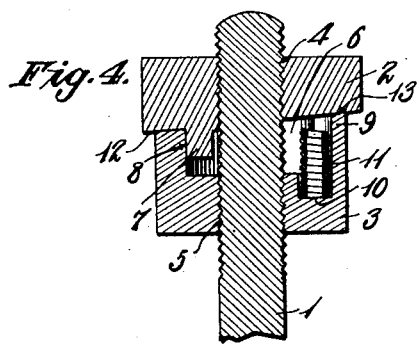
Figure 4 is a section on the line 4—4 of Figure 3.
Figure 5:
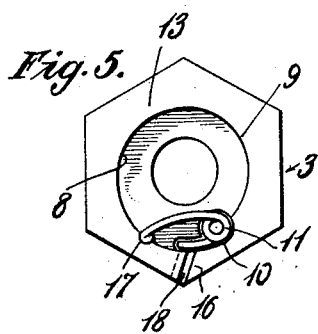
Figure 5 is a top plan view of the bottom or inner nut.
Figure 6:
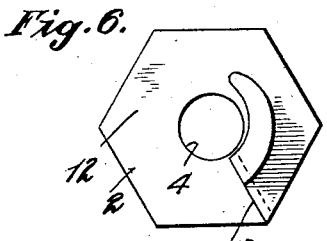
Figure 6 is a bottom plan view of top or outer nut.

Referring more particularly to the drawings, in connection with which like reference characters will designate corresponding parts throughout the several views, 1 indicates a form of bolt which may be employed in connection with my improved device, although, it is to be borne in mind that any form, design or type of bolt may be locked by the invention, such as conditions or preference may dictate.

The lock per se comprises juxtaposed nuts 2 and 3 having similarly threaded central apertures 4 and 5, the threads of said apertures also corresponding in pitch to the threads 6 of the bolt 1. For convenience the nut 2 will be termed the top or outer nut and the nut 3 the bottom or inner nut.

The bottom nut 3 is counter bored as at 6 to receive the downwardly projecting segmental cam member 7 formed on the inner face of the top nut 2, this cam member 7 being adapted to engage the inner cam face 8 of the wall 9 of the bottom nut 3 when the top nut 2 is rotated clockwise on the nut 1 to lock or clamped position, as will be more fully described hereinafter. This counter bore 6 is formed with a recess 10 in which seats the inner end of a coil spring 11 the purpose of which will be presently described.

The nuts 2 and 3 are formed with oppositely inclined opposing cam faces 12 and 13 terminating in shoulders 15 and 16 respectively, these shoulders being normally in abutting relation when the two nuts are simultaneously screwed upon the bolt 1. After the nuts have been screwed home on the bolt 1, a slight turning or clockwise movement is imparted to the outer nut 2. This causes the cam face 12 to ride upwardly or outwardly on the cam face 13, forcing the nuts slightly apart and thereby imparting a longitudinal jamming action between the threads of the bolt 1 and the threads of the nuts 2 and 3. At the same time a transverse jamming of the threads is effected due to the engagement of the segmental cam member 7 with the cam face 8 of the wall 9 of the nut 3.

The outer end 17 of the spring 11 bears against the shoulder 15 of the nut 2 and normally tends to rotate the nut 2 in clockwise direction. Consequently the jamming action hereinbefore mentioned will be automatically effected, it being understood that the strength of the spring 11 is sufficiently great to perform this function.

For convenience in assembling the parts, the free end 17 of the spring 11 may be forced under tension into the notch 18 formed in the nut 3 adjacent the shoulder 16 thereof, but this is not necessary. The nuts 2 and 3 can then be conveniently positioned with their shoulders 15 and 16 in abutting relation. After the nuts have been screwed upon the bolt 1, the end 17 of spring 11 is released from the notch 18 by the thumb nail or any convenient means, whereupon the spring will cause the nut 2 to rotate in clockwise direction. Further clockwise rotation beyond that due to the action of the spring may be effected by means of a wrench.

Having thus described my invention, what I claim is:

1. A nut lock comprising in combination with a bolt, interengaged similarly screw threaded nuts engaged on the bolt, said nuts having oppositely inclined engaging cam faces adapted to cause clamping engagement of said nuts with the threads of said bolt when said nuts are relatively rotated in opposite directions, and automatic means for causing such rotary movement.

2. A nut lock comprising in combination with a bolt, interengaged similarly screw threaded nuts engaged on said bolt, said nuts having engaging cam faces adapted to cause transverse clamping engagement of said nuts with the threads of said bolt and other engaging cam faces on said nuts adapted to cause longitudinal clamping engagement of said nuts with the threads of said bolt when said nuts are relatively rotated in opposite directions, and means carried by one of said nuts for causing such rotary movement.

In testimony whereof I affix my signature.

ALBERT B. BODIE.